United States Patent
Bealkowski et al.

(10) Patent No.: US 9,197,504 B2
(45) Date of Patent: *Nov. 24, 2015

(54) ENHANCED REMOTE PRESENCE

(71) Applicant: Lenovo Enterprise Solutions (Singapore) Pte. Ltd., Singapore (SG)

(72) Inventors: Richard Bealkowski, Redmond, WA (US); Edward J. Klodnicki, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 145 days.

This patent is subject to a terminal disclaimer.

(21) Appl. No.: 13/795,355

(22) Filed: Mar. 12, 2013

(65) Prior Publication Data

US 2014/0280812 A1 Sep. 18, 2014

Related U.S. Application Data

(63) Continuation of application No. 13/795,296, filed on Mar. 12, 2013.

(51) Int. Cl.
*H04L 12/24* (2006.01)

(52) U.S. Cl.
CPC .............. *H04L 41/082* (2013.01); *H04L 41/00* (2013.01); *H04L 41/042* (2013.01); *H04L 41/0663* (2013.01)

(58) Field of Classification Search
CPC . H04L 41/082; H04L 41/042; H04L 41/0663; H04L 12/24; H04L 21/8106; G06F 15/16; G06F 9/546; G06F 19/3406
USPC ................................... 709/223, 225; 455/411
See application file for complete search history.

(56) References Cited

U.S. PATENT DOCUMENTS

| | | | |
|---|---|---|---|
| 6,768,908 B1 * | 7/2004 | Jalloul | H04W 36/0055 370/331 |
| 7,512,830 B2 | 3/2009 | Chu et al. | |
| 7,552,213 B2 | 6/2009 | De Oliveira et al. | |
| 8,281,010 B2 * | 10/2012 | Ansari | G06Q 30/04 709/203 |
| 2002/0194388 A1 * | 12/2002 | Boloker | G06F 8/38 719/310 |
| 2003/0224758 A1 * | 12/2003 | O'Neill | H04L 12/4633 455/411 |

(Continued)

OTHER PUBLICATIONS

U.S. Appl. No. 13/795,296, 1 page.

(Continued)

*Primary Examiner* — Tesfay Yohannes
(74) *Attorney, Agent, or Firm* — Katherine S. Brown; Jeffrey L. Streets

(57) ABSTRACT

A mechanism is provided for enhancing remote presence capabilities. An update event for a main management module that manages a set of remote presence sessions for remote media established by a plurality of client systems is identified. A determination is made as to whether the main management module is currently maintaining a remote presence session for a remote media established by one of the plurality of client systems. Responsive to the main management module maintaining a remote presence session for the remote media, a handoff of the remote presence session for the remote media is initiated to an auxiliary management module. An update associated with the update event is then permitted to be performed on the main management module while maintaining the remote presence session for the remote media via the auxiliary management module.

8 Claims, 3 Drawing Sheets

(56) References Cited

U.S. PATENT DOCUMENTS

| | | | |
|---|---|---|---|
| 2004/0008645 A1* | 1/2004 | Janevski | H04W 36/0033 370/331 |
| 2006/0148451 A1* | 7/2006 | Narasimha | H04W 36/14 455/411 |
| 2007/0220301 A1 | 9/2007 | Brundridge et al. | |
| 2010/0146592 A1 | 6/2010 | Gamare et al. | |
| 2011/0087910 A1* | 4/2011 | Lambert | G06F 1/32 713/323 |
| 2012/0131360 A1* | 5/2012 | Zyren | H04L 12/10 713/310 |
| 2014/0033315 A1* | 1/2014 | Biswas | G06F 21/105 726/26 |
| 2014/0280812 A1* | 9/2014 | Bealkowski | H04L 1/082 709/223 |

OTHER PUBLICATIONS

"Intelligent Platform Management Interface", http://en.wikipedia.org/wiki/Intelligent_Platform_Management_Interface, retrieved Mar. 19, 2013, 5 pages.

* cited by examiner

ENHANCED REMOTE PRESENCE

BACKGROUND

The present application relates generally to an improved data processing apparatus and method and more specifically to mechanisms for enhancing remote presence capabilities.

Remote presence allows an individual currently accessing one system (a "client") to remotely access a second system (a "server"). The individual may attach media, such as a physical device, file system, media image, or the like, from the first system to the second system, which is then considered remote media by the second system. The second system may manage such remote media through a management module, such as the integrated management module (IMM) provided by IBM®.

SUMMARY

In one illustrative embodiment, a method, in a data processing system, is provided for enhancing remote presence capabilities. The illustrative embodiment identifies an update event for a main management module. In the illustrative embodiment the main management module manages a set of remote presence sessions for remote media established by a plurality of client systems. The illustrative embodiment determines whether the main management module is currently maintaining a remote presence session for a remote media established by one of the plurality of client systems. The illustrative embodiment initiates a handoff of the remote presence session for the remote media to an auxiliary management module in response to the main management module maintaining a remote presence session for the remote media. The illustrative embodiment permits an update associated with the update event to be performed on the main management module while maintaining the remote presence session for the remote media via the auxiliary management module.

In other illustrative embodiments, a computer program product comprising a computer useable or readable medium having a computer readable program is provided. The computer readable program, when executed on a computing device, causes the computing device to perform various ones of and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Remote presence allows an individual currently accessing one system (a "client") to remotely access a second system (a "server"). The individual may attach media, such as a physical device, file system, media image, or the like, from the client system to the server system, which is then considered remote media by the server system. The server system may manage such remote media through a management module, such as the integrated management module (IMM) provided by IBM®.

However, when a management module in the server system is reset, all remote media connectivity may be lost due to the reset and for a substantial amount of time after the server system has been reinitialized. The reset of the second system is especially problematic for system maintenance activities where the individual chooses to use remote presence and part of the work being performed requires updating the system firmware including firmware associated with the management module. In this event, the management module reset will cause all remote console sessions and remote media sessions to terminate. If the maintenance task was initiated via a "Live CD" or other remote media boot operation via the client system, then subsequent maintenance actions are likely to fail on the server system.

One current recovery technique is for the client system to be informed by the management module of the pending reset and to wait until the management module is once again responsive. Another current recovery technique is for the client system to employ a time-out technique to wait at least as long as a worst case management module reset interval. However, during the reset interval of the management module, the remote media on the client system is not available by the server system. Hence, other server-side operations may fail and/or be inaccessible during the management module reset interval.

Thus, the illustrative embodiments decouple remote presence support from such a management module reset interruption to ensure continued remote media operation. By providing a separately operable, yet integrated, remote presence subsystem, the management module and all of its associated hardware/firmware may be reset while still maintaining all remote presence sessions with a client system.

Figure 1:
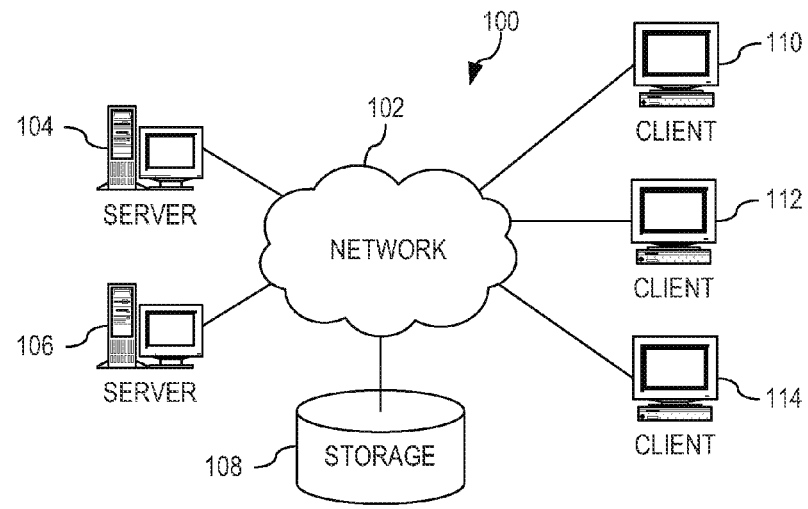
FIG. 1 is an example diagram of a distributed data processing system in which aspects of the illustrative embodiments may be implemented.
Figure 2:
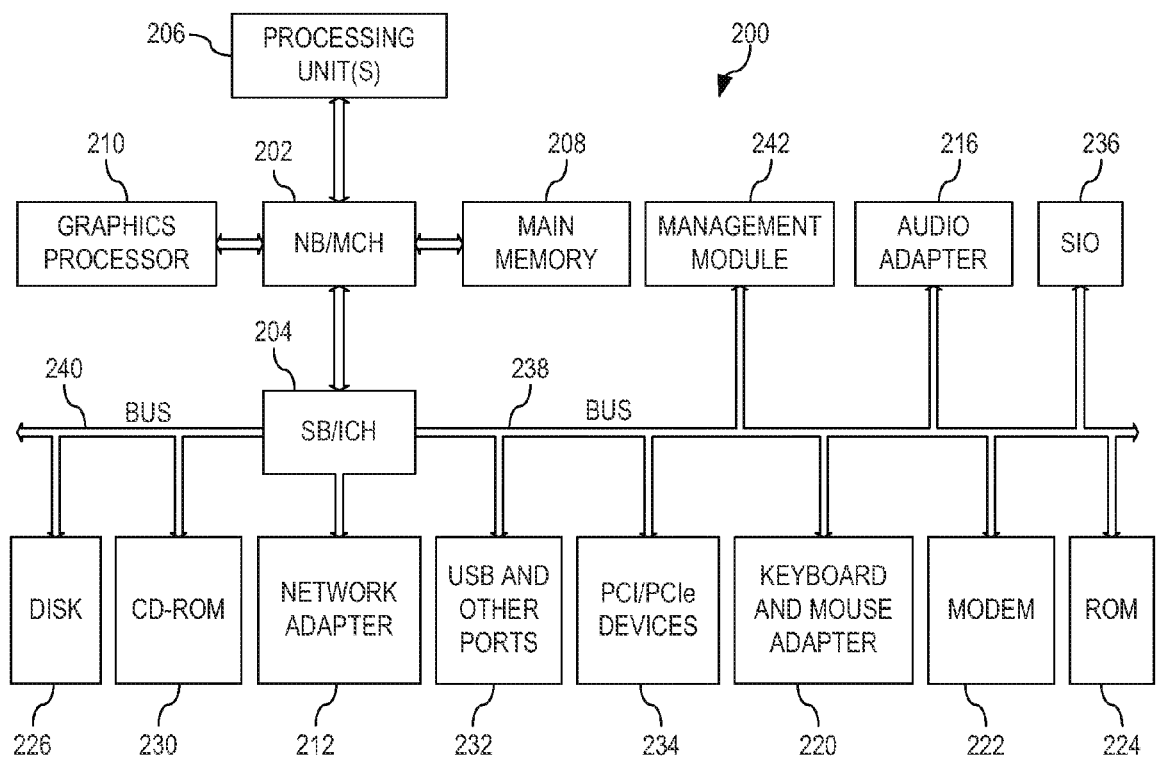
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented.

Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

Management module 242 provides various system management functions to data processing system 200. These various system management functions may include out-of-band (OOB) system management functions, such as powering on data processing system 200, powering off data processing system 200, or the like. Management module 242 may also provide other system management functions, such as sensing temperature, frequency, workload, voltage, or the like, as well as providing OOB remote presence monitoring.

An operating system or hypervisor runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ a programs or applications executing on data processing system 200.

As a server, data processing system 200 may be, for example, an IBM® System X® computer system, running the Windows® operating system, the LINUX® operating system, or a hypervisor such as those provided commercially by VMware®, Microsoft®, or Red Hat®. Data processing system 200 may be a symmetric multiprocessor (SMP) system including a plurality of processors in processing unit 206. Alternatively, a single processor system may be employed.

Instructions for the operating system or hypervisor, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
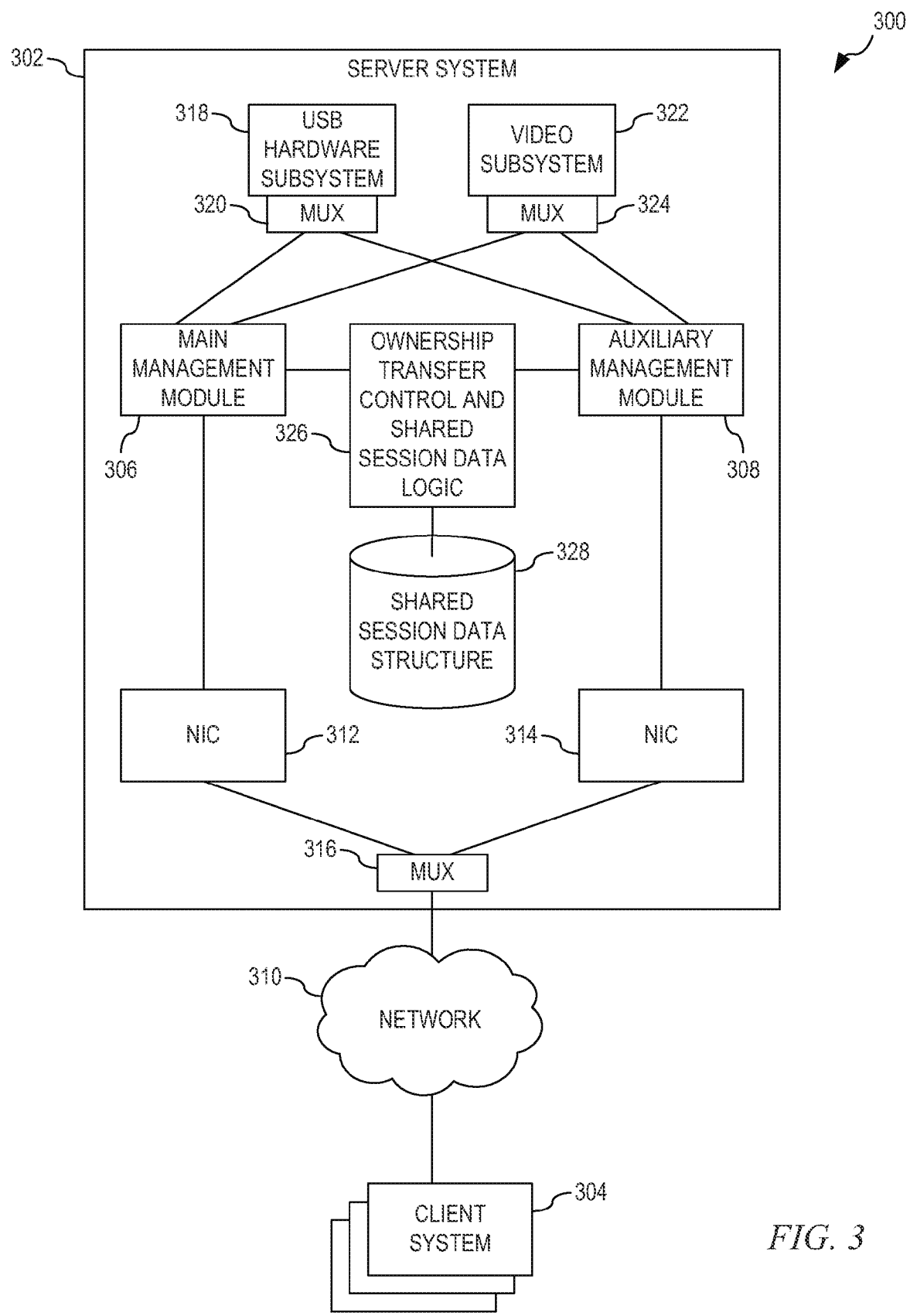
FIG. 3 depicts a mechanism for enhancing remote presence capabilities by decoupling remote presence support for remote media during a reset of a management module reset in accordance with an illustrative embodiment.

FIG. 3 depicts a mechanism for enhancing remote presence capabilities by decoupling remote presence support for remote media during a reset of a management module reset in accordance with an illustrative embodiment. Data processing system 300 comprises server system 302 and client system 304. Server system 302 comprises main management module 306, which may be an implementation of management module 242 of FIG. 2, as well as auxiliary management module 308. Main management module 306 and auxiliary management module 308 are coupled to network 310 via their own individual network interface controllers 312 and 314, respectively, and multiplexer 316, as is shown in FIG. 3. Although not shown, main management module 306 and auxiliary management module 308 may be alternatively coupled to network 310 via a single network interface controller and multiplexer, where main management module 306 and auxiliary management module 308 are coupled to the multiplexer first and the multiplexer is then coupled to the network interface controller which provides access to network 310. It should be noted that in this configuration, the network interface controller that is coupled to auxiliary management module 308 will be configured to use the same media access control (MAC) and Internet protocol (IP) addresses as the network interface controller that is connected to main management module 306 so that, when the switch occurs from main management module 306 to auxiliary management module 308 or vice versa, the switch goes undetected by client system 304 such that client system 304 presumes that communications are still with the same network interface controller as before and the session is uninterrupted.

Main management module 306 and auxiliary management module 308 are further coupled to Universal Serial Bus (USB) hardware subsystem 318 via multiplexer 320 as well as video subsystem 322 via multiplexer 324. USB hardware subsystem 318 and video subsystem 322 are common to ensure consistent enumeration for server system 302. That is, software, such as an operating system running on the server system 302, continues to see the same USB hardware topology and video topology connections.

Main management module 306 and auxiliary management module 308 are also coupled to each other via ownership transfer control and shared session data logic 326. Ownership transfer control and shared session data logic 326 provides hand-off, shared information handling, and heartbeat. The shared session data information includes the state information for the various remote media mounts from client system 304. This shared session data information may include a state of various tasks, session information, such as IP address of a client system 304, management of the various subsystems, such as USB hardware subsystem 318 and video subsystem 322, or the like.

When an individual attaches or mounts a media, such as a physical device, file system, media image, or the like via client system 304, thereby forming a remote media, and requests server system 302 perform some action in association with the remote media, main management module 306 creates and maintains a remote presence session for client system 304 for as long of time as client system 304 wants the remote media to be mounted. If during the time that main management module 306 has created and is maintaining a remote presence session for client system 304, main management module 306 and/or server system 302 may receive an update that requires main management module 306 be reset. If such an event occurs, ownership transfer control and shared session data logic 326 is notified of the intended reset event. Upon receiving the notification, ownership transfer control and shared session data logic 326 determines whether main management module 306 is currently maintaining an active remote presence session.

If ownership transfer control and shared session data logic 326 determines that main management module 306 is not currently maintaining an active remote presence session, then ownership transfer control and shared session data logic 326 allows the updates and reset to occur normally. However, if ownership transfer control and shared session data logic 326 determines that main management module 306 is currently maintaining an active remote presence session, then, prior to the update being performed and the reset of main management module 306 occurring, ownership transfer control and shared session data logic 326 initiates a handoff of the remote presence session to auxiliary management module 308 by setting a flag or indicator in shared session data structure 328 indicating that the handoff to auxiliary management module 308 is to occur. Upon recognizing that the handoff indicator has been set, auxiliary management module 308 sends a taking control signal to main management module 306 and establishes control of the remote presence session for client system 304. Auxiliary management module 308 establishing control of the remote presence session for client system 304 may comprise one or more of setting/resetting one or more of multiplexers 316, 320, or 324 to show that the remote presence session is now being controlled by auxiliary management module 308, setting a flag or indicator in shared session data structure 328 so that ownership transfer control and shared session data logic 326 may recognize that auxiliary management module 308 is in control, reading session data from shared session data structure 328, or the like.

Upon auxiliary management module 308 taking control of the remote presence session, ownership transfer control and shared session data logic 326 releases main management module 306 to perform any updates and then reset. Once main management module 306 has been updated, reset, and is fully functional, main management module 306 sets a flag or indicator in shared session data structure 328 so that ownership transfer control and shared session data logic 326 may recognize that main management module 306 is back online. When ownership transfer control and shared session data logic 326 sees the indicator from main management module 306, ownership transfer control and shared session data logic 326 initiates a handoff of the remote presence session to main management module 306 by setting a flag or indicator in shared session data structure 328 indicating that the handoff to main management module 306 is to occur.

Upon recognizing that the handoff indicator has been set, main management module 306 sends a taking control signal to auxiliary management module 308 and establishes control of the remote presence session for client system 304. Main management module 306 establishing control of the remote presence session for client system 304 may comprise one or more of setting/resetting one or more of multiplexers 316, 320, or 324 to show that the remote presence session is now being controlled by main management module 306, setting a flag or indicator in shared session data structure 328 so that ownership transfer control and shared session data logic 326 may recognize that main management module 306 is in control, reading session data from shared session data structure 328, or the like. Upon main management module 306 taking back control of the remote presence session, ownership transfer control and shared session data logic 326 releases auxiliary management module 308 to perform the same update as was performed for main management module 306.

Ownership transfer control and shared session data logic 326 may also perform the same handoff in response to updates being performed to network interface controllers 312 and 314, which are coupled to main management module 306 and auxiliary management module 308, respectively. That is, if there is an update that requires network interface controllers 312 and 314 to be updated and reset, then main management module 306 and auxiliary management module 308 will be affected. Thus, updates to network interface controllers 312 and 314 will not be performed at a same time. Ownership transfer control and shared session data logic 326 will perform the handoff of an active remote presence session to auxiliary management module 308 so that network interface controller 312 may be updated first. Then, once network interface controller 312 has been updated and reset, the active remote presence session will be handed back to main management module 306 so that network interface controller 314 may be updated and reset.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
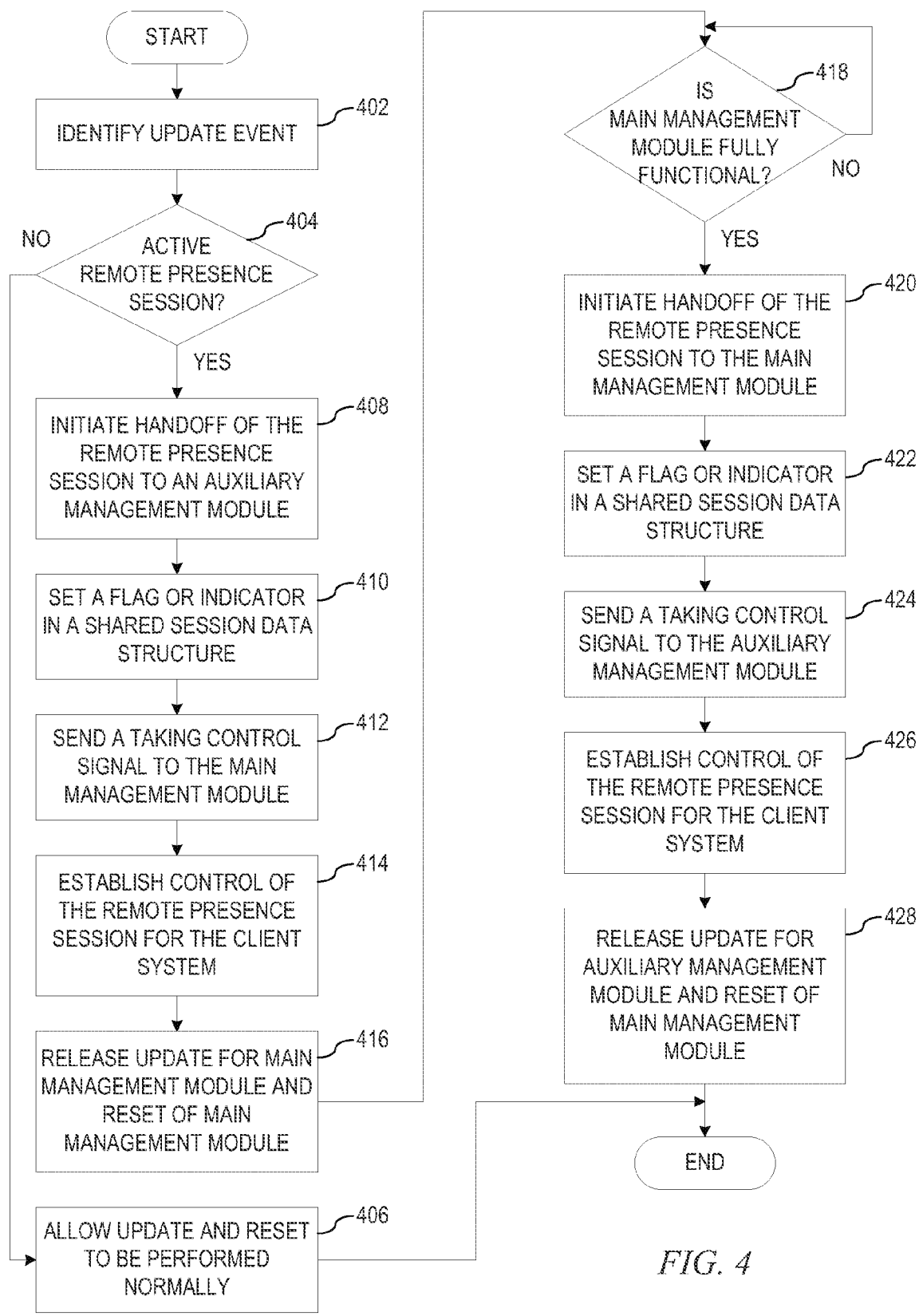
FIG. 4 depicts a flowchart of the operation performed in enhancing remote presence capabilities for remote media in accordance with an illustrative embodiment.

FIG. 4 depicts a flowchart of the operation performed in enhancing remote presence capabilities for remote media in accordance with an illustrative embodiment. As the operation begins, ownership transfer control and shared session data logic executed by a processor in a data processing system identifies that an update event is to be performed to a main management module or a device that affects the operation of the main management module (step 402). Upon detecting such an update event, the ownership transfer control and shared session data logic determines whether the main management module is currently maintaining an active remote presence session (step 404).

If at step 404 the ownership transfer control and shared session data logic determines that the main management module is not currently maintaining an active remote presence session, then the ownership transfer control and shared session data logic allows the update and reset to be performed normally to the main management module and the auxiliary management module (step 406), with the operation ending thereafter. If at step 404 the ownership transfer control and shared session data logic determines that the main management module is currently maintaining an active remote presence session, then, prior to the update being performed and a reset of the main management module occurring, the ownership transfer control and shared session data logic initiates a handoff of the remote presence session to an auxiliary management module (step 408). The ownership transfer control and shared session data logic initiates the handoff by setting a flag or indicator in a shared session data structure indicating that the handoff to the auxiliary management module is to occur (step 410).

Upon recognizing that the handoff indicator has been set, the auxiliary management module sends a taking control signal to the main management module (step 412) and establishes control of the remote presence session for the client system (step 414). The auxiliary management module establishing control of the remote presence session for the client system may comprise one or more of setting/resetting one or more of multiplexers to show that the remote presence session is now being controlled by the auxiliary management module, setting a flag or indicator in the shared session data structure so that the ownership transfer control and shared session data logic may recognize that the auxiliary management module is in control, reading session data from the shared session data structure, or the like.

Upon the auxiliary management module taking control of the remote presence session at step 414, the ownership transfer control and shared session data logic releases any updates to be performed for main management module and for the resetting of the main management module (step 416). The ownership transfer control and shared session data logic then periodically checks for the main management module to set a flag or indicator in the shared session data structure indicating that the main management module has been updated, reset, and is fully functional (step 418). If at step 418 the ownership transfer control and shared session data logic does not see the flag, then the ownership transfer control and shared session data logic continues to check at step 418. If at step 418 the ownership transfer control and shared session data logic sees the indicator from the main management module, the ownership transfer control and shared session data logic initiates a handoff of the remote presence session to the main management module (step 420). The ownership transfer control and shared session data logic initiates the handoff by setting a flag or indicator in a shared session data structure indicating that the handoff to the main management module is to occur (step 422).

Upon recognizing that the handoff indicator has been set, the main management module sends a taking control signal to the auxiliary management module (step 424) and establishes control of the remote presence session for the client system (step 426). The main management module establishing control of the remote presence session for the client system may comprise one or more of setting/resetting one or more of multiplexers to show that the remote presence session is now being controlled by the main management module, setting a flag or indicator in the shared session data structure so that the ownership transfer control and shared session data logic may recognize that the main management module is in control, reading session data from the shared session data structure, or the like. Upon the main management module taking back control of the remote presence session, the ownership transfer control and shared session data logic releases any updates to be performed for main management module and for the resetting of the main management module (step 428), with the operation ending thereafter.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for decoupling remote presence support from a main management module for updates and resets in order to provide continued remote media operation. By providing a separately operable, yet integrated, remote presence subsystem, the main management module and all of its associated hardware/firmware may be updated and reset while still maintaining all remote presence sessions for various client systems.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for enhancing remote presence capabilities, the method comprising:
    identifying an update event for a main management module, wherein the main management module manages a set of remote presence sessions for remote media established by a plurality of client systems;
    determining whether the main management module is currently maintaining a remote presence session for a remote media established by one of the plurality of client systems;
    responsive to the main management module maintaining a remote presence session for the remote media, initiating a handoff of the remote presence session for the remote media to an auxiliary management module; and
    permitting an update associated with the update event to be performed on the main management module while maintaining the remote presence session for the remote media via the auxiliary management module.

2. The method of claim 1, wherein initiating the handoff of the remote presence session for the remote media to the auxiliary management module further comprises:
    setting an indicator in a shared session data structure indicating that the handoff to the auxiliary management module is to occur;
    sending a taking control signal to the main management module; and
    establishing control of the remote presence session for the client system by the auxiliary management module.

3. The method of claim 2, wherein establishing control of the remote presence session for the client system comprises one or more of: setting/resetting one or more of multiplexers to show that the remote presence session is now being controlled by the auxiliary management module, setting an indicator in the shared session data structure indicating that the auxiliary management module is in control, or reading session data from the shared session data structure.

4. The method of claim 1, further comprising:
    determining whether the main management module has been updated, reset and is fully operational
    responsive to the main management module being updated, reset, and fully operational, initiating a handoff of the remote presence session for the remote media to the main management module; and
    permitting the update associated with the update event to be performed on the auxiliary management module.

5. The method of claim 4, wherein initiating the handoff of the remote presence session for the remote media to the main management module further comprises:
    setting an indicator in a shared session data structure indicating that the handoff to the main management module is to occur;
    sending a taking control signal to the auxiliary management module; and
    establishing control of the remote presence session for the client system by the main management module.

6. The method of claim 1, further comprising:
    responsive to the main management module failing to maintain the remote presence session for the remote media, allowing the update associated with the update event to be performed on the main management module and the auxiliary management module.

7. The method of claim 1, where in the remote media is one or more of a physical device, file system, or media image mounted from a client system to the data processing system.

8. The method of claim 1, wherein the update event is to a device that affects the operation of the main management module rather than the main management module itself.

* * * * *